United States Patent
Kubota et al.

(10) Patent No.: US 10,752,969 B2
(45) Date of Patent: Aug. 25, 2020

(54) STEEL FOR SUSPENSION SPRING AND METHOD OF MANUFACTURING SAME

(71) Applicant: NIPPON STEEL & SUMITOMO METAL CORPORATION, Tokyo (JP)

(72) Inventors: Manabu Kubota, Nishinomiya (JP); Koichi Banno, Hokkaido (JP); Keisuke Chiba, Toyota (JP); Ryuuichi Seki, Hokkaido (JP)

(73) Assignee: NIPPON STEEL CORPORATION, Tokyo (JP)

( * ) Notice: Subject to any disclaimer, the term of this patent is extended or adjusted under 35 U.S.C. 154(b) by 211 days.

(21) Appl. No.: 15/537,578

(22) PCT Filed: Mar. 10, 2016

(86) PCT No.: PCT/JP2016/057564
§ 371 (c)(1),
(2) Date: Jun. 19, 2017

(87) PCT Pub. No.: WO2016/143850
PCT Pub. Date: Sep. 15, 2016

(65) Prior Publication Data
US 2018/0265940 A1    Sep. 20, 2018

(30) Foreign Application Priority Data
Mar. 10, 2015    (JP) .................. 2015-046915

(51) Int. Cl.
*C21D 8/06*        (2006.01)
*C22C 38/58*      (2006.01)
(Continued)

(52) U.S. Cl.
CPC .............. *C21D 8/06* (2013.01); *C21D 9/52* (2013.01); *C22C 38/00* (2013.01); *C22C 38/02* (2013.01);
(Continued)

(58) Field of Classification Search
USPC ............................... 148/320, 333–335, 598
See application file for complete search history.

(56) References Cited

U.S. PATENT DOCUMENTS

2008/0279714 A1    11/2008    Hashimura et al.
2013/0037180 A1    2/2013     Sano et al.
(Continued)

FOREIGN PATENT DOCUMENTS

CN    1768155 A       5/2006
CN    100480411 C     4/2009
(Continued)

OTHER PUBLICATIONS

English language machine translation of JP-09263876-A to Yamazaki et al. Generated Jun. 25, 2019. (Year: 2019).*
(Continued)

*Primary Examiner* — Brian D Walck
(74) *Attorney, Agent, or Firm* — Birch, Stewart, Kolasch & Birch, LLP

(57) ABSTRACT

Steel for a suspension spring including, as a chemical composition, by % by mass: C: more than 0.40% and 0.65% or less; Si: 1.00% to 3.50%; Mn: more than 2.00% and 3.00% or less; Cr: 0.01% to 2.00%; V: 0.02% to 0.50%; P: 0.020% or less; S: 0.020% or less; N: 0.0100% or less; and a remainder of Fe and impurities, in which Kf is 280 or more, in which a structure contains a tempered martensite of which an area ratio is 90% or more, in which a Fe-based carbide precipitated in the tempered martensite is a cementite, and in which an average of an area ratios of prior austenite grains which stretch in a longitudinal direction of the steel and of which an aspect ratio exceeds 3.0, is 80% or more in a case of depths of 0.1 mm, 0.2 mm, and 0.3 mm in a sheet thickness direction from a surface of the steel.

6 Claims, 1 Drawing Sheet

(51) Int. Cl.

| | |
|---|---|
| *C21D 9/52* | (2006.01) |
| *C22C 38/02* | (2006.01) |
| *C22C 38/06* | (2006.01) |
| *F16F 1/02* | (2006.01) |
| *C22C 38/00* | (2006.01) |
| *C22C 38/20* | (2006.01) |
| *C22C 38/18* | (2006.01) |
| *C22C 38/28* | (2006.01) |
| *C22C 38/04* | (2006.01) |
| *C22C 38/24* | (2006.01) |
| *C22C 38/40* | (2006.01) |
| *C22C 38/26* | (2006.01) |
| *C22C 38/22* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |

(52) U.S. Cl.
CPC ............. *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *F16F 1/02* (2013.01)

(56) References Cited

U.S. PATENT DOCUMENTS

| | | |
|---|---|---|
| 2014/0377584 A1 | 12/2014 | Hasegawa et al. |
| 2016/0053355 A1 | 2/2016 | Takagi et al. |

FOREIGN PATENT DOCUMENTS

| | | | |
|---|---|---|---|
| EP | 2434028 A1 | | 3/2012 |
| EP | 2543747 A1 | | 1/2013 |
| JP | 08311616 A | * | 11/1996 |
| JP | 09263876 A | * | 10/1997 |
| JP | 2000-256740 A | | 9/2000 |
| JP | 2000-256741 A | | 9/2000 |
| JP | 3153072 B2 | | 4/2001 |
| JP | 3217589 B2 | | 10/2001 |
| JP | 2006-183137 A | | 7/2006 |
| JP | 4116762 B2 | | 7/2008 |
| JP | 2012-31462 A | | 2/2012 |
| JP | 2013-76148 A | | 4/2013 |
| JP | 2014-19894 A | | 2/2014 |
| JP | 2014-43612 A | | 3/2014 |
| JP | 2014-118613 A | | 6/2014 |
| WO | WO 2011/093319 A1 | | 8/2011 |
| WO | 2014/156187 A1 | | 10/2014 |

OTHER PUBLICATIONS

Extended European Search Report, dated Apr. 24, 2018, for corresponding European Application No. 16761816.4.
Chinese Office Action and Search Report for counterpart Chinese Application No. 201680005101.5, dated Apr. 28, 2018, with English translation of the Search Report.
International Search Report for PCT/JP2016/057564 dated Jun. 7, 2016.
Written Opinion of the International Searching Authority for PCT/JP2016/057564 (PCT/ISA/237) dated Jun. 7, 2016.

* cited by examiner

STEEL FOR SUSPENSION SPRING AND METHOD OF MANUFACTURING SAME

TECHNICAL FIELD OF THE INVENTION

The present invention relates to a steel for a suspension spring which is used in a suspension spring of a vehicle or the like and a method of manufacturing the same. Priority is claimed on Japanese Patent Application No. 2015-046915, filed on Mar. 10, 2015, the content of which is incorporated herein by reference.

RELATED ART

A suspension spring for a vehicle is the largest spring among the springs used in a vehicle, and is a relatively heavy component. Therefore, from the viewpoint of improving fuel efficiency of the vehicle, weight reduction is required. In addition, the weight reduction of the suspension spring contributes to reducing the weight of a so-called unsprung weight. When it is possible to reduce the unsprung weight, it becomes advantageous absorb of shock which the vehicle receives from a road surface during traveling, and thus, the weight reduction of the suspension spring contributes improve a ride quality of the vehicle, and improve grounding properties or stability and controllability during the traveling.

When increasing the strength of the suspension spring, it is possible to improve settling resistance and fatigue durability, and to use the suspension spring at a higher stress, and thus, it is possible to taper down a wire diameter of the spring. Therefore, currently, the tensile strength of the suspension spring used in the vehicle is approximately 1800 MPa, but it is necessary to further increase the strength of the suspension spring in order to reduce the weight.

However, there is a problem that hydrogen embrittlement sensitivity of a steel increases according to the increase in strength, and this mainly hinders an increase in the strength of the suspension spring. In order to achieve both high strength and high toughness, the suspension spring for a vehicle is manufactured by quenching and tempering. Therefore, a structure thereof is tempered martensite which is a structure obtained as martensite receives tempering. It is known that steel having such a structure in which a prior austenite (hereinafter, prior $\gamma$) boundary is embrittled when hydrogen infiltrates into the steel, and as a result, a brittle fracture is caused at a stress that is equal to or less than a yield strength of the steel. In addition, it is known that the brittle fracture is likely to occur at a low stress at a small amount of hydrogen as the strength of the steel increases.

The suspension spring is generally used in a state of being coated, and infiltration of hydrogen into a coated part is suppressed. However, the coating may be damaged by a stone chip or contact between wires of the spring while the vehicle travels. In a case where the coating is damaged, corrosion may occur from the part, and a part of hydrogen generated according to a corrosion reaction infiltrates into the steel. Therefore, even in a case of steel for a suspension spring used being coated, in order to increase the strength, it is necessary to take a measure against hydrogen embrittlement.

In order to suppress prior $\gamma$ grain boundary fracture and to improve hydrogen embrittlement resistance, it is efficient to stretch the prior $\gamma$ grain of a martensite structure. In particular, it is efficient to stretch the prior $\gamma$ grain of a surface part.

For example, in Patent Document 1 and Patent Document 2, steel for a high strength spring in which fatigue properties or delayed fracture resistance properties when the hydrogen is stored in the steel are improved by setting an aspect ratio of a prior $\gamma$ grain to be 1.5 to 2, is suggested. In addition, in Patent Document 3 and Patent Document 4, similar to the steel for a suspension spring, a technology of controlling the aspect ratio of the prior $\gamma$ grain with respect to steel bars for prestressed concrete (a member manufactured by quenching and tempering among tendons for prestressed concrete (PC)) by which hydrogen embrittlement resistance (delayed fracture resistance properties) is improved, is suggested.

However, the technology disclosed in Patent Document 1 to Patent Document 4 obtains martensite which is rapidly cooled from a state of unrecrystallized $\gamma$ at a surface part of a wire rod, that is, a martensite structure having a prior $\gamma$ grain which stretches in a longitudinal direction of the wire rod, by controlling the temperature of finish rolling to be lower than a normal temperature and by performing quenching immediately after the finish rolling, in hot working in a $\gamma$ (austenite) region. The treatment can be realized when a dedicated manufacturing line for manufacturing a steel wire of steel for a spring, using a hot rolled wire rod as a material. However, in a case of using a general-purpose rolling line, it is difficult to realize the martensite structure having the stretched prior $\gamma$ grain. The reason thereof is as follows.

(1) Wire rod rolling is multi-stage processing in which reduction of area is large. Therefore, since the $\gamma$ (austenite) is rolled into a shape of a wire rod while repeating recrystallization, a $\gamma$ grain size becomes fine. When the $\gamma$ grain size is fine, the recrystallization is likely to occur after the finish rolling. Since the $\gamma$ after the recrystallization has a shape which is close to a spheroidal shape, in the wire rod rolling, it is difficult to obtain the stretched unrecrystallized $\gamma$.

(2) It is possible to suppress recrystallization of $\gamma$ by performing the rapid cooling immediately after the wire rod rooling. However, in a general-purpose wire rod rolling line, it is not possible to perform the rapid cooling immediately after the finish rolling due to the layout. This is because, in the general-purpose wire rod rolling line, winding is performed after the finish rolling, the wire rod made in a shape of a coil is transported by a conveyor, and it is necessary to immerse the wire rod into a cooling bath in which a medium (for example, water) for performing the rapid cooling after the transportation is kept. In other words, in the general-purpose wire rod rolling line, until performing the rapid cooling after the finish rolling, generally, it takes approximately several seconds to tens of seconds, and recrystallization of the $\gamma$ is likely to occur during this time.

(3) Meanwhile, by lowering a finish rolling temperature for suppressing the recrystallization, it is possible to suppress the recrystallization of $\gamma$ after the finish rolling to a certain degree. However, when the finish rolling temperature is lowered, diffusion and transformation are promoted by the processing of $\gamma$, and thus, ferrite (hereinafter, a) before the rapid cooling is precipitated and the strength of the steel deteriorates. In a case where the strength deteriorates, it is not possible to use the steel as the steel for a suspension spring.

(4) In addition, in a steel having a large amount of C similar to the steel for a suspension spring, quenching cracks are likely to be generated. The quenching cracks are likely to be generated in a case where cooling during the quenching is ununiform. While it is possible to perform the cooling relatively uniformly in a case of performing the rapid cooling in a state of a wire rod, it is difficult to uniformly cool the coil due to a difference in position between an overlapping part and a non-overlapping part of the wire rod or between an upper part and a lower part of the coil, and ununiformity of a flow of a quenching medium in the cooling bath in a case of performing the rapid cooling in a state of a coil wound after the wire rod rolling. Therefore, in a case of rapidly cooling the coil by the general-purpose wire rod rolling line, it is necessary to pay attention to the quenching cracks.

Considering the above-described reasons, a technology for industrially producing the steel for a suspension spring which has the tempered martensite structure in which the prior γ grain stretches to the surface part of the steel, and has excellent hydrogen embrittlement resistance, while suppressing generation of the quenching cracks by using the general-purpose wire rod rolling line, does not exist yet.

Therefore, when it is possible to manufacture the martensite structure having the stretched prior γ grain by the general-purpose wire rod rolling line, for example, that manufactures the hot rolled wire rod using a steel piece as a material, it is not necessary to invest in facilities of a dedicated manufacturing line, and it is possible to perform the manufacturing at a low cost.

PRIOR ART DOCUMENT

Patent Document

[Patent Document 1] Japanese Patent (Granted) Publication No. 4116762
[Patent Document 2] Japanese Unexamined Patent Application, First Publication No. 2014-43612
[Patent Document 3] Japanese Patent (Granted) Publication No. 3153072
[Patent Document 4] Japanese Patent (Granted) Publication No. 3217589

DISCLOSURE OF THE INVENTION

Problems to be Solved by the Invention

In order to obtain steel for a suspension spring having a high strength and excellent hydrogen embrittlement resistance, the inventors have thoroughly studied a technology for suppressing recrystallization of γ of the steel for a suspension spring, for suppressing precipitation of a according to transformation of γ→α, and for suppressing quenching cracks. Specifically, a steel composition and a rolling condition for suppressing the recrystallization of γ during the period from finish rolling and winding to rapid cooling in wire rod rolling, a steel composition and a rolling condition for suppressing the precipitation of a during the period from the finish rolling and the winding to the rapid cooling, and a steel composition and a cooling condition for preventing the quenching cracks during the rapid cooling, were investigated. As a result, it has been revealed that it is possible to substantially suppress the recrystallization of the processed γ by setting the finish rolling temperature to be 850° C. or less after containing V, it is possible to prevent the precipitation of a during the period from the finish rolling to the rapid cooling by increasing the amount of Mn to be greater than that of the steel for a spring in the related art, and it is possible to suppress a cooling rate of 800° C. to 300° C. after containing alloying elements such that parameters that are set considering a contribution degree of each of the elements become a predetermined amount or more, in order to obtain the martensite while avoiding excessive rapid cooling.

Means for Solving the Problem

The main idea of the present invention is as follows based on the above-described knowledge.

(1) According to an aspect of the present invention, there is provided steel for a suspension spring, as a chemical composition, by % by mass: C: more than 0.40% and 0.65% or less; Si: 1.00% to 3.50%; Mn: more than 2.00% and 3.00% or less; Cr: 0.01% to 2.00%; V: 0.02% to 0.50%; Al: 0% to 0.060%; Mo: 0% or more and less than 0.50%; Cu: 0% to 1.00%; Ni: 0% to 1.50%; Nb: 0% to 0.015%; Ti: 0% to 0.200%; B: 0% to 0.0050%; P: limited to 0.020% or less; S: limited to 0.020% or less: N: limited to 0.0100% or less; and a remainder of Fe and impurities, in which Kf defined by the following Equation (a) is 280 or more, in which a structure contains a tempered martensite of which an area ratio is 90% or more, in which a Fe-based carbide precipitated in the tempered martensite is a cementite, and in which an average of an area ratios of prior austenite grains which stretch in a longitudinal direction of the steel and of which an aspect ratio exceeds 3.0, is 80% or more in a case of depths of 0.1 mm, 0.2 mm, and 0.3 mm in a sheet thickness direction from a surface of the steel.

$$Kf=10^{(3.288 \times C (\%) - 0.168 \times Si (\%) + 1.068 \times Mn (\%) + 0.3 \times Ni (\%) + 1.266 \times Cr (\%) + 0.626 \times Cu (\%) + 2.086 \times Mo (\%) - 1.931)} \quad (a)$$

here, C (%), Si (%), Mn (%), Ni (%), Cr (%), Cu (%), and Mo (%) in the equation (a) indicate the amounts of C, Si, Mn, Ni, Cr, Cu, and Mo by % by mass, and in a case where the elements are not contained, the value is 0.

(2) The steel for a suspension spring according to (1), may include, as a chemical composition, by % by mass: one of or two or more of Mo: 0.02% or more and less than 0.50%; Cu: 0.02% to 1.0%; Ni: 0.02% to 1.5%; and Nb: 0.002% to 0.015%.

(3) The steel for a suspension spring according to (1) or (2), may include, as a chemical composition, by % by mass: one of or both of Ti: 0.010% to 0.200%; and B: 0.0005% to 0.0050%, in which the amount of Ti and the amount of N satisfy Ti≥3.5×N.

(4) According to another aspect of the present invention, there is provided a method of manufacturing the steel for a suspension spring according to any one of (1) to (3), the method including: heating a steel piece containing the chemical composition within a temperature range of 950° C. or more and less than 1150° C.; a wire rod rolling including a finish rolling in which a reduction of an area is 30% or more and a finish rolling temperature is 750° C. to 850° C., with respect to the heated steel piece to obtain a wire rod; winding with respect to the wire rod to make the wire rod into a coil; cooling the coil so as to start cooling in 5 to 30 seconds after the performing of the winding and to set an average cooling rate when the temperature is 800 to 300° C. to be 5 to 50° C./s to cool the coil until reaching 300° C. or less; and tempering of retention for 10 to 1800 seconds at 410° C. to 500° C. after the cooling.

Effects of the Invention

According to the above-described aspect of the present invention, it is possible to provide the steel for a suspension spring which has a high strength in which a tensile strength is 1900 MPa or more and excellent hydrogen embrittlement resistance. By using the steel for a suspension spring, it is possible to increase the strength of the suspension spring, and thus, it is possible to contribute to reducing the weight of the suspension spring for a vehicle.

In addition, according to the method of manufacturing the steel for a suspension spring according to the above-described aspect of the present invention, since it is possible to manufacture the steel for a suspension spring having a high strength and excellent hydrogen embrittlement resistance by a general-purpose wire rod rolling line, it is possible to contribute to reducing the manufacturing costs.

Therefore, industrial contribution of the present invention is extremely large.

EMBODIMENTS OF THE INVENTION

Figure 1:
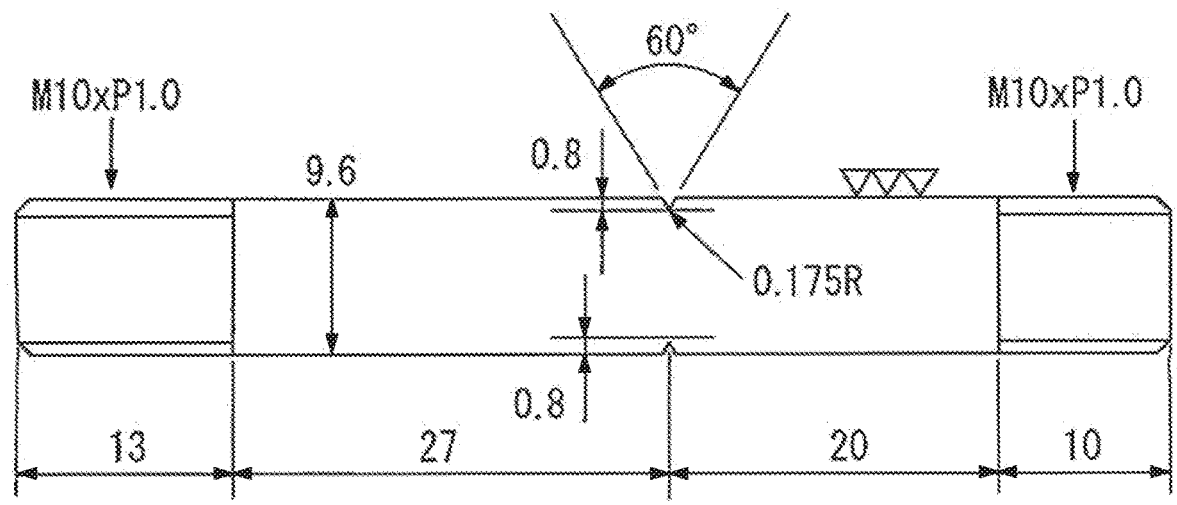
FIG. 1 is a view showing a shape of a test piece of a delayed fracture test.

Steel for a suspension spring according to one embodiment of the present invention will be described.

The steel for a suspension spring according to the embodiment has the following characteristics.

(a) A steel for a suspension spring including, as a chemical composition, by % by mass: C: more than 0.40% and 0.65% or less; Si: 1.00% to 3.50%; Mn: more than 2.00% and 3.00% or less; Cr: 0.01% to 2.00%; V: 0.02% to 0.50%; Al: 0% to 0.060%; Mo: 0% or more and less than 0.50%; Cu: 0% to 1.00%; Ni: 0% to 1.50%; Nb: 0% to 0.015%; Ti: 0% to 0.200%; B: 0% to 0.0050%; P: 0.020% or less; S: 0.020% or less: N: 0.0100% or less; and a remainder of Fe and impurities, in which Kf defined by the following Equation (1) is 280 or more, $$Kf = 10^{(3.288 \times C\,(\%) - 0.168 \times Si\,(\%) + 1.068 \times Mn\,(\%) + 0.3 \times Ni\,(\%) + 1.266 \times Cr\,(\%) + 0.626 \times Cu\,(\%) + 2.086 \times Mo\,(\%) - 1.931)} \quad (1)$$

here, C (%), Si (%), Mn (%), Ni (%), Cr (%), Cu (%), and Mo (%) in the Equation (1) indicate the amounts of C, Si, Mn, Ni, Cr, Cu, and Mo by % by mass, and in a case where the elements are not contained, the value is 0.

(b) A structure contains tempered martensite of which an area ratio is 90% or more.

(c) Fe-based carbide precipitated in the tempered martensite is cementite.

(d) The average of area ratios of prior austenite grains which stretch in a longitudinal direction of the steel and of which an aspect ratio exceeds 3.0, is 80% or more in a case of depths of 0.1 mm, 0.2 mm, and 0.3 mm in a sheet thickness direction from a surface of the steel.

In addition, when spring-processing the steel for a suspension spring according to the embodiment by a known method, a suspension spring having a high strength and excellent delayed fracture resistance properties is obtained.

The above-described characteristics are based on the following knowledge obtained by thorough investigation regarding a technology for suppressing recrystallization of γ of the steel for a suspension spring, for suppressing precipitation of a, and for suppressing quenching cracks.

(1) In a structure on a surface layer of the steel for a suspension spring containing the tempered martensite, particularly, in a range from the surface layer to 0.3 mm, when stretching the prior γ grain with respect to the longitudinal direction of the wire rod, the hydrogen embrittlement resistance is improved.

(2) By containing a predetermined amount of V and by setting the finish rolling temperature to be 850° C. or less, it is possible to substantially suppress the recrystallization of γ (processed γ) processed after the wire rod rolling.

(3) As the amount of Mn exceeds 2%, even in a case where the finish rolling temperature is lowered to be 850° C. or less, it is possible to suppress diffusion and transformation of γ after the rolling and precipitation of a.

(4) In order to prevent the quenching cracks of the wire rod, by delaying the cooling rate during the quenching of the wire rod coil after the winding, it is efficient to mitigate temperature distribution in the coil.

(5) When slowing the cooling rate during the quenching of the wire rod, the martensite becomes unlikely to be generated. Therefore, in order to set the martensite fraction (area ratio) after the cooling to be 90% or more, it is necessary to increase hardenability of the steel. It is possible to obtain 90% or more of martensite by setting the amount of alloying elements to be an amount or more which is based on a certain relation.

Hereinafter, the steel (sometimes referred to as steel for a suspension spring according to the embodiment) according to one embodiment of the present invention will be described.

First, a chemical composition of the steel for a suspension spring according to the embodiment will be described. Hereinafter, % regarding the chemical composition indicates % by mass.

[C: More than 0.40% and 0.65% or Less]

C is an element necessary for improving the strength of the steel containing the tempered martensite. In order to ensure the strength as the steel for a suspension spring, it is necessary to set the amount of C to exceed 0.40%. The lower limit of the amount of C is preferably 0.50%. Meanwhile, when the amount of C exceeds 0.65%, ductility and toughness of the steel deteriorate. In addition, when the amount of C exceeds 0.65%, by increasing the amount of retained γ, the sufficient amount of tempered martensite is not obtained, and as a result, it is not possible to ensure the mechanical properties as the suspension spring. Therefore, the upper limit of the amount of C is 0.65%. The upper limit of the amount of C is preferably 0.60%.

[Si: 1.00% to 3.50%]

Si is an element which is extremely efficient in improving resistance to temper softening of the tempered martensite steel similar to the steel for a suspension spring. In addition, Si is an element which is also efficient in improving settling resistance of the spring. In order to obtain the effects, it is necessary to set the lower limit of the amount of Si to be 1.00%. The lower limit of the amount of Si is preferably 1.20%. Meanwhile, when the amount of Si exceeds 3.50%, a problem, such as an increase in decarburization of the surface layer of the steel for a spring, becomes serious. Therefore, the upper limit of the amount of Si is set to be 3.50%. The upper limit of the amount of Si is preferably 2.50%, and the upper limit is more preferably 2.00%.

[Mn: More than 2.00% and 3.00% or Less]

Mn is an important element in the steel for a suspension spring according to the embodiment. In order to obtain the martensite having a stretched prior γ grain by suppressing the recrystallization of unrecrystallized γ after finish rolling, it is efficient to lower a finish rolling temperature. However, in wire rod rolling, since the rolling is performed into a wire rod shape while reduction of area is increased, γ receives multi-stage processing, and the recrystallization is repeated, the γ grain size becomes fine. When the γ grain size is fine, the recrystallization is likely to occur after the finish rolling, and thus, it is difficult to obtain the unrecrystallized γ. In addition, in a case of assuming the use of a general-purpose wire rod rolling line, considering the layout, it necessarily takes several seconds to tens of seconds until rapid cooling from the finish rolling, and thus, it is not possible to perform cooling immediately after the finish rolling. Therefore, the recrystallization is likely to occur during from the finish rolling to the rapid cooling. Therefore, in order to obtain the martensite containing the stretched prior γ grain using the general-purpose wire rod rolling line, it is necessary to lower the finish rolling temperature to be lower than that of a general operating condition. However, since the processing of γ promotes a transformation which is the diffusion and transformation, when lowering the finish rolling temperature, a problem that a is precipitated from the processed γ occurs. When precipitating a, a structure in which soft a is mixed into the martensite even when the rapid cooling is performed after this, it is not possible to increase the martensite fraction, and as a result, it is not possible to obtain the strength required a steel for the suspension spring. Meanwhile, in a region in which the transformation to α is not performed in an equilibrium state, the transformation does not occur even when applying the processing to γ. Therefore, as a larger amount of Mn than that of the related art is contained in the wire rod, it is extremely efficient to widen a γ region to a low temperature side by lowering an Ar3 point (temperature at which the austenite starts to be transformed). In addition, even in a region in which the transformation into α is performed in the equilibrium state, the temperature region in which the α transformation is started is lowered due to an increase in Mn, the transformation start time moves to a long time side, and thus, it is advantageous to suppress the α transformation.

In order to obtain the above-described effect, in the steel for a suspension spring according to the embodiment, it is necessary that the amount of Mn exceeds 2.00%. The lower limit of the amount of Mn is preferably 2.10%, the lower limit of the amount of Mn is more preferably 2.20%, and the lower limit is still more preferably 2.30%. Meanwhile, when the amount of Mn exceeds 3.00%, the amount of the retained γ increases, and a defect, such as that a sufficient amount of martensite is not obtained, conspicuous appears. Therefore, the upper limit of the amount of Mn is set to be 3.00%. The upper limit of the amount of Mn is preferably 2.60%.

In the related art, when the amount of Mn exceeds 2.00% in the steel for a spring, it is considered that the delayed fracture resistance properties deteriorate. However, in the steel for a suspension spring according to the embodiment, by controlling Kf determined by the amount of Mn, the amount of other elements, such as V which will be described later, and the amount of each composition at the same time, the above-described effect is obtained, and thus, it is possible to obtain excellent delayed fracture resistance properties.

[Cr: 0.01% to 2.00%]

Cr is an element efficient for improving hardenability or improving resistance to temper softening of the steel for a suspension spring. In order to obtain the above-described effect, it is necessary to set the lower limit of the amount of Cr to be 0.01%. The lower limit of the amount of Cr is preferably 0.20%. Meanwhile, when the amount of Cr exceeds 2.00%, a problem, such as hindrance to solutionizing of the cementite into γ during the heating becomes serious. Therefore, the upper limit of the amount of Cr is set to 2.00%. The upper limit of the amount of Cr is preferably 1.00%.

[V: 0.02% to 0.50%]

V is an important element in the steel for a suspension spring according to the embodiment. In order to obtain the martensite having the stretched prior γ grain by suppressing recrystallization of the unrecrystallized γ after the wire rod rolling, it is efficient to lower the finish rolling temperature. However, as described above, in the wire rod rolling, the γ grain size becomes fine. In addition, in the general-purpose wire rod rolling line, it requires time to the rapid cooling after the finish rolling. Therefore, when the finish rolling temperature is lowered, the recrystallization is likely to occur during the period from the finish rolling to the rapid cooling, and it is difficult to obtain the unrecrystallized γ. Therefore, it is required to set the finish rolling temperature to be lower than that of the general operating condition, but when the finish rolling temperature becomes excessively low, miss roll is likely to be generated. Since V is extremely efficient in suppressing the recrystallization of γ, by containing V, it is possible to stably obtain the unrecrystallized γ for a long period of time in a general low temperature finish rolling condition, and it is possible to avoid excessive low finish rolling temperature. In order to obtain the above-described effect, it is necessary to set the lower limit of the amount of V to be 0.02%. The lower limit of the amount of V is preferably 0.05%, and the lower limit of the amount of V is more preferably 0.10%. Meanwhile, since V is an expensive alloying element, it is disadvantageous from the viewpoint of the manufacturing costs when the amount of V exceeds 0.50%. Therefore, the upper limit of the amount of V is set to be 0.50%. The upper limit of the amount of V is preferably 0.20%.

[P: 0.020% or Less]

P is an impurity, and is an element which embrittles the prior γ boundary and deteriorates delayed fracture resistance properties (hydrogen embrittlement resistance). Therefore, it is necessary to limit the amount of P to be 0.020% or less. The amount of P is preferably limited to 0.015% or less.

[S: 0.020% or Less]

S is an impurity, and is an element which embrittles the prior γ boundary and deteriorates delayed fracture resistance properties (hydrogen embrittlement resistance). Therefore, it is necessary to limit the amount of S to be 0.020% or less. The amount of S is preferably limited to 0.015% or less, and is more preferably limited to 0.006% or less.

[N: 0.0100% or Less]

N is an impurity, and is an element which deteriorates hot rolling of the steel and damages manufacturability during continuous casting. Therefore, it is necessary to limit the amount of N to be 0.0100% or less. The amount of N is preferably limited to 0.0070% or less.

The steel for a suspension spring according to the embodiment basically contains the above-described chemical composition and the remainder of Fe and impurities. In the embodiment, when industrially manufacturing the steel, the impurities mean composition mixed from a raw material, such as ore or scrap, and due to other reasons.

However, in the steel for a suspension spring according to the embodiment, as necessary, one of or two or more of Al, Mo, Cu, Ni, and Nb may further be contained with the range which will be described later. However, since the elements are not necessarily contained, the lower limits thereof are 0%.

[Al: 0.010% to 0.060%]

Al is an element efficient in deoxidizing the steel. In a case where the deoxidation is performed by Si, Al may not be necessarily contained, but in a case where the deoxidation is performed by Al, 0.010% or more of Al is preferably contained. Meanwhile, when the amount of Al exceeds 0.060%, a problem, such as deterioration of toughness due to generation of coarse inclusion, becomes serious. Therefore, even in a case of containing Al, the upper limit of the amount of Al is set to be 0.060%

[Mo: 0.02% or More and Less than 0.50%]

Mo is an element which contributes to improving hardenability of the steel with a small amount thereof. In addition, Mo is efficient in suppressing the recrystallization of the processed γ, and has a function of complementing the effect of suppressing the recrystallization of the processed γ by containing the V. In a case of obtaining the above-described effect, the amount of Mo is preferably set to be 0.02% or more. The amount of Mo is more preferably 0.05% or more. Meanwhile, since Mo is an expensive alloying element, it is disadvantageous from the viewpoint of manufacturing costs when the amount of Mo becomes 0.50% or more. Therefore, even in a case of containing Mo, the amount of Mo is set to be less than 0.50%. The amount of Mo is preferably 0.30 or less.

[Cu: 0.02% to 1.00%]

Cu is an element which improves corrosion resistance. In a case of obtaining the above-described effect, it is necessary to set the amount of Cu to be 0.02% or more. The amount of Cu is preferably 0.05% or more. Meanwhile, when the amount of Cu exceeds 1.00%, a problem that the hot rolling of the steel deteriorates, cracks or surface imperfections are generated during the continuous casting, and manufacturing yield deteriorates, becomes serious. Therefore, even in a case of containing the Cu, the amount of Cu is set to be 1.00% or less. The amount of Cu is preferably 0.20% or less.

[Ni: 0.02% to 1.50%]

Ni is an element which improves corrosion resistance, and is an element efficient in improving toughness. In a case of obtaining the above-described effect, it is necessary to set the amount of Ni to be 0.02% or more. The amount of Ni is preferably 0.10% or more. Meanwhile, since Ni is an expensive alloying element, it is disadvantageous from the viewpoint of manufacturing costs when the amount of Ni exceeds 1.50%. Therefore, even in a case of containing Ni, the amount of Ni is set to be 1.50% or less. The amount of Ni is preferably 0.50% or less.

[Nb: 0.002% to 0.015%]

Nb is an element efficient in suppressing the recrystallization of the processed γ, and has a function of complementing the effect of suppressing the recrystallization of the processed γ by containing V. In a case of obtaining the above-described effect, the amount of Nb is preferably set to be 0.002% or more. The amount of Nb is more preferably 0.005% or more. Meanwhile, when the amount of Nb exceeds 0.015%, a problem not only that the effect is saturated but also that cracks or surface defects are generated during the continuous casting and manufacturing yield deteriorates, becomes serious. Therefore, even in a case of containing the Nb, the amount of Nb is set to be 0.015% or less. The amount of Nb is preferably 0.010% or less.

The steel for a suspension spring according to the embodiment may further contain one or both of Ti and B within the following range as necessary. However, since the elements are not necessarily contained, the lower limits thereof are 0%.

[Ti: 0.010% to 0.200%]

Ti is an element efficient in suppressing the recrystallization of the processed γ, and has a function of complementing the effect of suppressing the recrystallization of the processed γ by containing V. In addition, in a case of containing B at the same time, by stably fixing solid solution N in the steel from the high temperature in a figuration of TiN, generation of BN is suppressed. Therefore, Ti is an element efficient in ensuring the amount of solid solution B. When the amount of solid solution B is ensured, it is possible to obtain the effect of improving hardenability by the solid solution B. In a case of obtaining the above-described effect, it is necessary to set the amount of Ti to be 0.010% or more. The amount of Ti is preferably 0.015% or more. Meanwhile, when the amount of Ti exceeds 0.200%, a problem not only that the effect is saturated but also that toughness deteriorates as the coarse Ti (CN) is generated, becomes serious. Therefore, even in a case of containing Ti, the amount of Ti is set to be 0.200% or less. The amount of Ti is preferably 0.100% or less.

[B: 0.0005% to 0.0050%]

B is an element which contributes to improving the hardenability of the steel with a fine amount thereof. In addition, B has an effect of suppressing grain boundary fracture by segregating into the prior γ grain and strengthening the prior γ boundary. In a case of obtaining the above-described effect, the amount of B is preferably 0.0005% or more. The amount of B is more preferably 0.0010% or more. Meanwhile, when the amount of B exceeds 0.0050%, not only the effect is saturated but also B forms a precipitate, such as BN or $Fe_{23}(C,B)_6$, and on the contrary, deteriorates a grain boundary strength. Therefore, even in a case of containing B, the amount of B is set to be 0.0050% or less. The amount of B is preferably 0.0030% or less.

[Ti≥3.5×N]

In order to obtain the above-described effect by containing B, it is necessary to suppress generation of BN by reducing the solid solution N in the steel. Therefore, it is desirable to reduce the amount of N and to stably fix the solid solution N from a high temperature in a figuration of TiN by containing Ti. In a case of containing Ti and B, in order to obtain the above-described effect by fixing the solid solution N by Ti, it is preferable that the relationship between the amounts of Ti and N is Ti≥3.5×N. A more preferable range is Ti≥4.0×N.

In the steel for a suspension spring according to the embodiment, after providing the above-described chemical composition, further, it is necessary to control Kf which is a hardenability parameter that is calculated using the amounts of each of the elements.

[Kf≥280]

In a case of a chemical composition in which the amount of C is large similar to the steel for a suspension spring, the quenching cracks are likely to be generated when transforming the martensite by performing the rapid cooling with respect to the wire rod. In particular, in a case of more rapidly cooling the coil than that in a state of a single wire, the quenching cracks are likely to be generated. In order to prevent the quenching cracks of the wire rod, it is efficient to mitigate the temperature distribution in the coil by lowering the cooling rate when cooling (quenching) the wire rod coil after the winding. However, there is a concern that α is precipitated during the cooling when lowering the cooling rate, and it is not possible to obtain necessary tempered martensite fracture (area ratio) as the steel for a suspension spring. Meanwhile, even in a case of lowering the cooling rate during the quenching, in order to obtain a predetermined martensite fraction after the cooling, it is necessary to increase the hardenability of the steel (wire rod).

The inventors have found that it is possible to achieve both of prevention of the quenching cracks and ensuring of the martensite fraction by setting the Kf defined by the following Equation (1) to be 280 or more. A preferable range of Kf is 300 or more. Meanwhile, when Kf becomes excessively high, the retained γ may be excessively generated and the tempered martensite having a sufficient area ratio cannot be obtained in the steel for a suspension spring. Therefore, Kf is preferably set to be 10000 or less.

$$Kf = 10^{(3.288 \times C\,(\%) - 0.168 \times Si\,(\%) + 1.068 \times Mn\,(\%) + 0.3 \times Ni\,(\%) + 1.266 \times Cr\,(\%) + 0.626 \times Cu\,(\%) + 2.086 \times Mo\,(\%) - 1.931)} \quad (1)$$

here, C (%), Si (%), Mn (%), Ni (%), Cr (%), Cu (%), and Mo (%) in the Equation (1) respectively indicate the amounts of C, Si, Mn, Ni, Cr, Cu, and Mo by % by mass, and in a case where the elements are not contained, the value is 0.

Next, a metallographic structure of the steel for a suspension spring according to the embodiment will be described.

[Area Ratio of Tempered Martensite: 90% or More]

Since the spring is a mechanical element that uses a restoring force as an elastic body, and accumulates elastic energy, the spring is necessary the large yield strength. Therefore, in the steel for a suspension spring, it is necessary to use the tempered martensite which can obtain a high yield strength and has excellent toughness as the main structure. In the steel for a suspension spring according to the embodiment, the proportion of the tempered martensite in the structure is set to be 90% or more by the area ratio. When the area ratio of the tempered martensite is less than 90%, it is not possible to sufficiently ensure both of strength and toughness.

When the area ratio of the tempered martensite is 90% or more, as a remainder, one or more of ferrite, pearlite, bainite, or residual austenite may also be contained. However, it is desirable to reduce the area ratio of the structure other than the tempered martensite as much as possible. The total area ratio of one or more of ferrite, pearlite, bainite, and residual austenite is preferably 5% or less, that is, the area ratio of the tempered martensite is preferably 95% or more. The remainder may be 0%, and in this case, the area ratio of the tempered martensite is 100%.

The area ratio of the tempered martensite etched by 3% of nital (3% of nitrate-ethanol solution) after performing mirror polishing with respect to the section in the longitudinal direction of the steel, and the area ratios are acquired in each visual field by observing the surface part of 0.1 mm from the surface of the steel for a suspension spring and each of the 3 visual fields at a ½ position of a radius at a magnification of 1000 times using an optical microscope, and are evaluated by the average thereof. In the steel for a suspension spring according to the embodiment, by performing the evaluation, it is possible to evaluate the area ratio of the tempered martensite as a representative area ratio in the entire steel.

In the tempered martensite, the Fe-based carbide is precipitated. In the steel for a suspension spring according to the embodiment, the Fe-based carbide in the tempered martensite is cementite ($\theta$). As the Fe-based carbide, for example, there is a case of precipitating $\varepsilon$ in addition to $\theta$. However, since hydrogen embrittlement resistance of $\varepsilon$ is inferior to that of $\theta$, in a case where c is precipitated as the Fe-based carbide, it is not possible to obtain sufficient hydrogen embrittlement resistance.

Identification of the Fe-based carbide can be performed by the following method.

According to whether or not a heating peak is observed within a temperature range of 300° C. to 430° C. by a differential thermal analysis (Differential Scanning calorimeter: DSC), the presence and absence of the Fe-based carbide $\varepsilon$ is confirmed, and by performing restricted visual field electron beam diffraction pattern analysis by a thin film TEM observation, it is distinguished whether the Fe-based carbide is $\varepsilon$ or $\theta$.

[In Depths of 0.1 mm, 0.2 mm, and 0.3 mm in Sheet Thickness Direction from Surface of Steel, Average of Area Ratio of Prior Austenite Grain which Stretches in Longitudinal Direction of Steel and of which Aspect Ratio Exceeds 3.0 is 80% or More]

In the steel which mainly contains the tempered martensite as the structure, when hydrogen infiltrates into the steel, the prior $\gamma$ boundary is saturated. As a result, brittle fracture occurs at a stress lower than the yield strength of the steel. In order to improve hydrogen embrittlement resistance, it is efficient to stretch the prior $\gamma$ grain of the martensite.

In addition, the fracture in the prior $\gamma$ boundary is generated starting a defect caused by corrosion in a case of the suspension spring manufactured by the steel for a suspension spring. In other words, the prior $\gamma$ grain boundary fracture is generated from the surface layer of the suspension spring. Therefore, in order to suppress the prior $\gamma$ grain boundary fracture generated from the surface layer of the suspension spring, it is extremely important to stretch the prior $\gamma$ grain of the surface layer of the steel for a suspension spring in the longitudinal direction of the steel for a suspension spring. In addition, it is efficient to stretch the prior $\gamma$ grain of the surface layer of the wire rod which is a material of the steel for a suspension spring for suppressing the prior $\gamma$ grain boundary fracture in the longitudinal direction of the wire rod.

In order to improve the hydrogen embrittlement resistance, the shape of the prior $\gamma$ grain of the surface layer, in particular, a ratio (aspect ratio=length/width) of the length (rolling direction) and the width (radial direction) is important, and the effect of suppressing the prior $\gamma$ grain boundary fracture increases as the aspect ratio increases. In addition, as the proportion of the prior $\gamma$ grain size having a large aspect ratio increases, the effect is stably obtained. The inventors have found that it is necessary the prior $\gamma$ grain size in which the aspect ratio exceeds 3.0 to set to be 80% or more by the area ratio among all of the prior $\gamma$ grains in order to stably obtain the above-described effect. The aspect ratio of the prior $\gamma$ grain size is preferably 3.5 or more.

In addition, the inventors have found that the effect of suppressing the prior $\gamma$ grain boundary fracture is not sufficient when the area ratio of the prior $\gamma$ grain in which the aspect ratio exceeds 3.0 is 80% or more on average in the range from the surface of the steel to a depth of 0.3 mm. It is considered that this is because a certain proportion or more of the prior $\gamma$ grain having a large aspect ratio is necessarily present to the position (depth) that is not influenced by the corrosion from the surface of the steel since the defect caused by the corrosion is a starting point of the prior $\gamma$ grain boundary fracture due to hydrogen embrittlement in the steel for a suspension spring.

Figure 2:
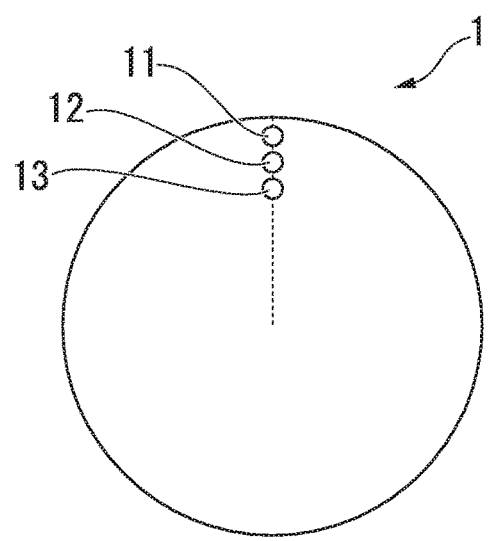
FIG. 2 is a view showing an example of a measuring position of an area ratio of a stretched prior γ grain on a section of steel for a suspension spring.

Here, in the embodiment, for example, as shown in FIG. 2, the area ratio of the prior $\gamma$ grain in which the aspect ratio exceeds 3.0 in the range from the surface of the steel to 0.3 mm is a value obtained by measuring the area ratio of the prior $\gamma$ grain in which the aspect ratio exceeds 3.0 and averaging the area ratios, on a straight line oriented toward the center of a steel for a suspension spring 1 from the surface of the steel for a suspension spring 1, and in each of a position 11 having a depth of 0.1 mm, a position 12 having a depth of 0.2 mm, and a position 13 having a depth of 0.3 from the surface of the steel for a suspension spring 1.

In order to more stably obtain the effect of suppressing the prior $\gamma$ grain boundary fracture by the stretched prior $\gamma$ grain, at the depth of 0.3 mm from the surface of the steel, the area ratio of the prior $\gamma$ grain in which the aspect ratio exceeds 3.0 is preferably 80% or more. In addition, at the position having a depth of 0.5 mm from the surface of the steel, the area ratio of the prior $\gamma$ grain in which the aspect ratio exceeds 3.0 is preferably 85% or more.

The aspect ratio is obtained by measuring at least 15 or more grains at each of the measuring positions and averaging the values.

Next, a method of manufacturing the steel for a suspension spring according to the embodiment will be described.

The steel for a suspension spring according to the embodiment can be manufactured by the method of manufacturing including the following processes. In addition, the method of manufacturing can be realized by using the general-purpose wire rod rolling line.

[Heating Process]

As a material of the steel for a suspension spring according to the embodiment, it is possible to use a steel piece which has the above-described chemical composition and is manufactured via a general steel manufacturing process and a blooming process.

First, since the steel piece is made in a shape of a wire rod by performing the hot rolling, the steel piece is heated to the γ region. When the heating temperature is 950° C. or less, a rolling finish temperature becomes excessively low, and thus, it is necessary to set the heating temperature to be 950° C. or more. The heating temperature is preferably 1000° C. or more. Meanwhile, when the heating temperature is excessively high, the steel piece is decarburized. The decarburized layer of the surface layer formed in a stage of the steel piece is taken over to the suspension spring manufactured by the wire rod obtained by rolling the steel piece, the steel for a suspension spring obtained by tempering the wire rod, and the steel for a suspension spring, and causes deterioration of fatigue strength of the suspension spring. Therefore, it is necessary to set the heating temperature of the steel piece to be less than 1150° C. The heating temperature is preferably 1100° C. or less.

[Wire Rod Rolling Process]

The steel piece is formed in a shape of a wire rod by performing the wire rod rolling including rough rolling, intermediate rolling, and finish rolling with respect to the heated steel piece. The steel for a suspension spring according to the embodiment stretches the γ grain of the surface part of the steel in the longitudinal direction in the finish rolling. In order to obtain the prior γ grain having a desirable aspect ratio, in the finish rolling, it is necessary to set the reduction of area to be 30% or more. The reduction of area is preferably 40% or more.

As the finish rolling temperature decreases, the recrystallization of the processed γ is suppressed. Therefore, in the manufacturing method of the steel for a suspension spring according to the embodiment, in order to obtain the prior γ grain having a desirable aspect ratio, it is necessary to set the finish rolling temperature to be 850° C. or less. The finish rolling temperature is preferably 840° C. or less. Meanwhile, a problem that miss roll is likely to be generated when the finish rolling temperature is excessively low, or the like, becomes serious. Therefore, the lower limit of the finish rolling temperature is set to be 750° C. The lower limit is preferably 780° C.

[Winding Process]
[Cooling Process]

By performing the winding continuously to the finish rolling, the wire rod is made into a coil (wire rod coil).

In addition, after finishing the winding, the cooling starts in 5 to 30 seconds, and the quenching is performed by rapidly cooling the wire rod coil. When performing the quenching, for example, the wire rod made in a shape of coil is transported by using a conveyor, and is immersed into a cooling bath in which a medium (water or the like) for performing the rapid cooling after the transportation is kept.

When the period from the winding to the start of the rapid cooling exceeds 30 seconds, the recrystallization occurs during this. Therefore, it is necessary to set the period from the finish of the winding to the rapid cooling to be within 30 seconds. The period is preferably within 20 seconds. Meanwhile, from the viewpoint of making the temperature uniform on the section of the wire rod, after finishing the winding, it is preferable not to perform cooling immediately, but to perform the rapid cooling in 5 seconds or more. When the period from the finish of the winding to the start of the cooling is less than 5 seconds, the ununiformity of the crystal grain is facilitated since the quenching is performed while the temperature on the section of the wire rod becomes ununiform, and as a result, there is a concern that the hydrogen embrittlement resistance deteriorates.

When rapidly cooling the wire rod coil continuously to the winding, it is necessary to cool the temperature range of 800° C. to 300° C. until reaching 300° C. or less at 5° C./s or more of an average cooling rate. When the cooling rate is less than 5° C./s, the martensite is not sufficiently generated, and as a result, a desirable tempered martensite fraction is not obtained by the steel for a suspension spring. The cooling rate is preferably 10° C./s or more. Meanwhile, the temperature unevenness in the coil increases when the cooling rate becomes excessively high, and there is a concern that the quenching cracks are generated. Therefore, the upper limit of the cooling rate is set to be 50° C./s. The upper limit of the cooling rate is preferably 40° C./s. In addition, when a cooling stop temperature exceeds 300° C., the martensite is not sufficiently formed.

The cooling rate in a case of immersing the wire rod coil into the cooling bath and rapidly cooling the wire rod coil can be controlled by changing the temperature of the cooling medium. In other words, for example, in a case of using water as the cooling medium, by changing a water temperature, it is possible to control the cooling rate of the wire rod coil within a predetermined range. In addition, a diameter of the wire rod is also a cause, but in a case of using water at a room temperature or oil having higher quenching capacity than that of the water as the cooling medium, there is a concern that the cooling rate of the wire rod coil exceeds 50° C./s, and thus, as the cooling medium, it is preferable to use water (warm water) having a temperature of 40° C. or more, and is more preferable to use water at 80° C. or more.

The steel for a suspension spring according to the embodiment suppresses the recrystallization of γ and the precipitation of a by V and Mn, and further ensures a certain degree or more of hardenability by setting Kf to be 280 or more, and thus, the average cooling rate of 800° C. to 300° C. may be 5° C./s. In a case of setting the cooling rate to be in the above-described range, it is preferable to immerse the wire rod coil into the cooling bath, but when the cooling rate can be 5° C./s or more, the cooling may be performed by air blast cooling after the winding.

[Tempering Process]

The tempering is performed with respect to the wire rod to which the above-described heating process, the wire rod rolling process, the winding process, and the cooling process are performed. The temperature of the tempering can be appropriately changed in accordance with desirable properties, but it is preferable to perform the retention for 10 seconds to 1800 seconds within a range of 410° C. to 550° C. Furthermore, it is preferable to perform the retention for 10 seconds to 1800 seconds within a range of 430° C. to 520° C.

A case where the tempering temperature is less than 410° C. is not preferable since the Fe-based carbide is E main constituent. In addition, a case where the tempering temperature exceeds 550° C. is not preferable since there is a concern that α desirable tensile strength is not obtained.

With respect to the wire rod coil, straightening and drawing are performed, and by performing the tempering in a state of a single wire, the steel wire (steel for a suspension spring) which is a material of a cold formed suspension spring is obtained.

The method of manufacturing the steel for a suspension spring according to the embodiment may further include a temporary tempering process of performing temporary tempering with respect to the wire rod coil between the cooling process and the tempering process. The temporary tempering is efficient in preventing a season cracking of the wire rod, or in preventing disconnection during the straightening and the drawing by improving toughness or ductility. In order to suppress deterioration of the strength in a case of performing the temporary tempering, it is preferable to perform the temporary tempering at a temperature lower than that of a condition of the tempering by a single wire after this. In a case where toughness and ductility are sufficient during the straightening and the drawing, it is not necessary to perform the temporary tempering.

The above-described steel for a suspension spring can be processed to the suspension spring by a known processing method.

EXAMPLE

Next, the present invention will be described by using Examples, but the present invention is not limited to the following examples.

First, converter ingot steel having the chemical composition (remainder is Fe and impurities) shown in Table 1 was performed the continuous casting to obtain a cast piece. Soaking and blooming were performed with respect to the cast piece as necessary, and a material (steel piece) for the wire rod rolling in which the section has an angle of 162 mm (length 162 mm×width 162 mm) was obtained. Next, the steel piece was made into a wire rod having a diameter of 10 mm or 14 mm by performing the heating and the wire rod rolling under the condition shown in Table 2-1. Furthermore, after making the wire rod in a shape of a coil by performing the winding in the hot state continuous to the hot rolling, the coil was transported to the cooling bath which is provided at a rear part of the rolling line for cooling the wire rod by a transport conveyor, and the quenching was performed by immersing the wire rod into the cooling bath after the transportation except for some of part of the wire rods. The wire rod is transported by the conveyor after being wound, and the time period until being immersed into the cooling bath was 16 seconds in any case. As the cooling medium in the cooling bath, water having a water temperature as described in Table 2-1 or medium oil was used. The wire rod which was immersed into the cooling bath was cooled until reaching the temperature which was substantially the same as the temperature of the cooling medium, and the wire rod which was not immersed into the cooling rod was cooled to 250° C. by the air blast cooling or by the air cooling after the winding. After this, the temporary tempering was performed under the condition of retention for 30 minutes at 300° C. as necessary, and the straightening was performed. Continuously, the drawing was performed with respect to the wire rod having a diameter of 14 mm to have a diameter of 13 mm and with respect to the wire rod having a diameter of 10 mm to have a diameter of 9.2 mm, and by performing the tempering at the temperature of Table 2-1, the wire for a spring (steel for a suspension spring) was obtained. The heating time of the tempering was 15 seconds.

3.5×N in Table 1 was calculated only in a case where Ti was contained. In addition, blank spaces in other elements of Table 1 indicate that the amounts thereof are less than a detection limit.

TABLE 1

| Steel No. | C | Si | Mn | P | S | Cr | Mo | V | Ni | Cu | Al | Nb | Ti | N | B | Kf | (mass %) 3.5 × N |
|---|---|---|---|---|---|---|---|---|---|---|---|---|---|---|---|---|---|
| 1 | 0.54 | 1.34 | 2.16 | 0.008 | 0.002 | 0.70 |  | 0.10 | 0.10 | 0.10 | 0.028 |  |  | 0.0030 |  | 799 |  |
| 2 | 0.41 | 1.52 | 3.00 | 0.012 | 0.001 | 0.07 |  | 0.12 |  |  | 0.031 |  |  | 0.0043 |  | 284 |  |
| 3 | 0.65 | 1.51 | 2.10 | 0.008 | 0.005 | 0.01 |  | 0.15 |  |  | 0.028 |  |  | 0.0034 |  | 526 |  |
| 4 | 0.50 | 3.50 | 2.30 | 0.010 | 0.005 | 0.20 |  | 0.19 | 1.00 | 1.00 | 0.023 |  |  | 0.0048 |  | 576 |  |
| 5 | 0.60 | 1.00 | 2.10 | 0.012 | 0.004 | 0.01 | 0.30 | 0.18 | 0.02 | 0.05 | 0.029 |  |  | 0.0026 |  | 620 |  |
| 6 | 0.51 | 2.50 | 2.01 | 0.008 | 0.001 | 2.00 |  | 0.11 |  | 0.20 | 0.027 |  |  | 0.0058 |  | 13482 |  |
| 7 | 0.51 | 1.20 | 2.60 | 0.004 | 0.002 | 0.30 | 0.02 | 0.19 | 0.15 | 0.02 | 0.021 |  |  | 0.0056 |  | 631 |  |
| 8 | 0.51 | 1.37 | 2.19 | 0.003 | 0.005 | 1.00 |  |  | 0.10 | 0.50 | 0.030 |  |  | 0.0039 |  | 1863 |  |
| 9 | 0.55 | 1.59 | 2.12 | 0.011 | 0.003 | 0.50 | 0.49 | 0.20 |  |  | 0.016 |  |  | 0.0024 |  | 3453 |  |
| 10 | 0.56 | 1.70 | 2.26 | 0.001 | 0.006 | 0.67 | 0.30 | 0.16 |  |  | 0.016 |  |  | 0.0036 |  | 3123 |  |
| 11 | 0.52 | 1.42 | 2.12 | 0.013 | 0.005 | 0.65 |  | 0.50 |  |  | 0.040 |  |  | 0.0033 |  | 431 |  |
| 12 | 0.53 | 1.34 | 2.18 | 0.002 | 0.001 | 0.75 |  | 0.16 |  |  | 0.021 | 0.010 |  | 0.0030 |  | 761 |  |
| 13 | 0.55 | 1.43 | 2.25 | 0.013 | 0.004 | 0.78 |  | 0.02 |  |  | 0.029 | 0.015 |  | 0.0020 |  | 1063 |  |
| 14 | 0.54 | 1.63 | 2.34 | 0.008 | 0.003 | 0.74 |  | 0.16 |  |  | 0.026 | 0.005 | 0.010 | 0.0025 |  | 991 | 0.009 |
| 15 | 0.53 | 1.56 | 2.33 | 0.009 | 0.004 | 0.69 |  | 0.17 |  |  |  |  | 0.200 | 0.0041 |  | 825 | 0.014 |
| 16 | 0.51 | 1.65 | 2.34 | 0.002 | 0.005 | 0.77 |  | 0.15 |  |  | 0.018 | 0.002 | 0.015 | 0.0046 |  | 893 | 0.016 |
| 17 | 0.54 | 1.39 | 2.31 | 0.012 | 0.005 | 0.75 |  | 0.14 |  |  | 0.010 |  | 0.100 | 0.0100 |  | 1091 | 0.035 |
| 18 | 0.55 | 1.69 | 2.34 | 0.009 | 0.001 | 0.66 |  | 0.19 |  |  | 0.029 |  | 0.035 | 0.0032 | 0.0005 | 844 | 0.011 |
| 19 | 0.52 | 1.62 | 2.26 | 0.004 | 0.002 | 0.72 |  | 0.09 |  |  | 0.017 |  | 0.035 | 0.0047 | 0.0050 | 678 | 0.017 |
| 20 | 0.53 | 1.56 | 2.21 | 0.009 | 0.006 | 0.65 |  | 0.16 |  |  | 0.060 |  | 0.035 | 0.0057 | 0.0010 | 534 | 0.020 |
| 21 | 0.56 | 1.65 | 2.25 | 0.006 | 0.004 | 0.68 |  | 0.13 |  |  | 0.027 |  | 0.035 | 0.0035 | 0.0030 | 783 | 0.012 |
| 22 | 0.53 | 1.66 | 2.25 | 0.010 | 0.003 | 0.79 |  | 0.05 |  |  | 0.020 |  | 0.035 | 0.0036 |  | 867 | 0.013 |
| 23 | 0.53 | 1.59 | 2.25 | 0.006 | 0.005 | 0.65 |  | 0.20 |  |  | 0.023 |  | 0.035 | 0.0060 |  | 614 | 0.021 |
| 24 | 0.55 | 1.39 | 2.25 | 0.004 | 0.002 | 0.73 | 0.20 | 0.09 |  |  | 0.023 |  |  | 0.0070 |  | 2551 |  |
| 31 | 0.80 | 1.44 | 2.27 | 0.008 | 0.005 | 0.75 |  | 0.19 |  |  | 0.039 |  |  | 0.0034 |  | 6795 |  |
| 32 | 0.35 | 1.58 | 2.24 | 0.004 | 0.001 | 0.89 |  | 0.14 |  |  | 0.023 |  |  | 0.0049 |  | 300 |  |
| 33 | 0.54 | 1.52 | 2.11 | 0.004 | 0.001 | 0.44 |  | 0.18 |  |  | 0.024 |  |  | 0.0039 |  | 251 |  |
| 34 | 0.52 | 0.50 | 2.28 | 0.009 | 0.005 | 0.74 |  | 0.20 |  |  | 0.025 |  |  | 0.0042 |  | 1165 |  |
| 35 | 0.50 | 1.62 | 1.80 | 0.007 | 0.002 | 0.90 |  | 0.16 |  |  | 0.030 |  |  | 0.0033 |  | 318 |  |
| 36 | 0.55 | 1.68 | 2.32 | 0.025 | 0.001 | 0.61 |  | 0.16 |  |  | 0.040 |  |  | 0.0028 |  | 684 |  |

TABLE 1-continued

| Steel No. | C | Si | Mn | P | S | Cr | Mo | V | Ni | Cu | Al | Nb | Ti | N | B | Kf | (mass %) 3.5 × N |
|---|---|---|---|---|---|---|---|---|---|---|---|---|---|---|---|---|---|
| 37 | 0.51 | 1.35 | 2.28 | 0.005 | 0.025 | 0.75 | | 0.19 | | | 0.038 | | | 0.0052 | | 807 | |
| 39 | 0.53 | 1.39 | 2.25 | 0.013 | 0.001 | 0.66 | | 0.01 | | | 0.016 | | | 0.0059 | | 646 | |
| 40 | 0.51 | 1.61 | 2.17 | 0.002 | 0.003 | 0.66 | | | | | 0.036 | | | 0.0032 | | 444 | |
| 41 | 0.54 | 1.47 | 2.34 | 0.009 | 0.003 | 0.72 | 0.20 | | | | 0.040 | | | 0.0057 | | 2600 | |

Underlines indicate that values fall outside the range of the present invention.

A test piece for structure observation, a tension test piece, and a delayed fracture test piece were collected from the wire for a spring manufactured in this manner. The structure observation was performed by using an optical microscope after performing polishing and etching a cut section of the test piece for structure observation which was collected by cutting the wire at the center part in the longitudinal direction. The result is shown in Table 2-2.

The tempered martensite fraction (area ratio) was evaluated by acquiring the area ratios in each visual field by observing the surface part of 0.1 mm from the surface of the test piece to which nital etching was performed and each of the 3 visual fields at a ½ position of a radius from the surface at a magnification of 1000 times using an optical microscope, and by averaging the area ratios.

In addition, when performing the structure observation, it was observed whether or not the surface layer was decarburized, and in a case where the generation of ferrite grain was confirmed within range of a depth of 30 μm from the surface or more by the decarburization, it was determined that the wire for a spring was not appropriate.

In addition, the prior γ grain was observed using the test piece to which the etching was performed by a solution obtained by adding a small amount of sodium dodecylbenzenesulfonate into a picric acid saturated aqueous solution, and the aspect ratio of the prior austenite grain from the surface layer to the depth of 0.3 mm and the area ratio of the prior austenite grain in which the aspect ratio exceeds 3.0 were measured. Specifically, at each of the positions having a depth of 0.1 mm, a depth of 0.2 mm, and a depth of 0.3 mm from the surface, the observation using the optical microscope having a magnification of 1000 times was respectively performed in 5 visual fields, and after the observation, the aspect ratio of the prior γ grain size and the area ratio of the prior γ grain in which the aspect ratio exceeds 3.0 are measured by the image analysis, and the average of 5 visual fields was considered as the aspect ratio of the prior γ grain size at each position and the area ratio of the prior γ grain in which the aspect ratio exceeds 3.0. In addition, the average of the area ratios of the prior γ grain size in which the aspect ratio obtained at each position exceeds 3.0 was calculated, and the calculated average was considered as an average value of a prior γ grain area ratio in which the aspect ratio from the surface layer to the depth of 3 mm exceeds 3.0.

The Fe-based carbide in the tempered martensite was observed and measured by the following method. According to whether or not the heating peak was observed within the temperature range of 300° C. to 430° C. by the differential thermal analysis (Differential Scanning calorimeter: DSC), the presence and absence of the Fe-based carbides was confirmed, and by performing the restricted visual field electron beam diffraction pattern analysis by a thin film TEM observation, it was distinguished whether the Fe-based carbide is ε or θ.

The tension test was performed using a round bar tension test in accordance with JIS Z 2201 and Z 2241. As a result of the tension test, when the tensile strength was less than 1900 MPa, it was determined that the strength was not sufficient.

The delayed fracture test was performed in the following manner. In other words, using the test piece having a shape shown in FIG. 1, after storing various amounts of hydrogen in the test piece in advance by electrolytic charging, and performing coating for preventing the hydrogen from escaping to the test piece, and after the coating, a constant load which was 0.3 times the tensile strength was applied. By performing the test with respect to the test piece charged by various amounts of hydrogen, a critical diffusible hydrogen content which was the upper limit of the amount of hydrogen by which the test piece did not cause the delayed fracture within 100 hours was measured. As a result of the delayed fracture test, it was determined that the delayed fracture resistance properties (hydrogen embrittlement resistance) deteriorates when the critical diffusible hydrogen content was less than 0.40 ppm.

The result is shown in Table 2-3.

TABLE 2-1

| Manufacturing No. | Steel No. | Rolling heating temperature (° C.) | Finish rolling reduction of area (%) | Rolling finish temperature (° C.) | Diameter of wire rod (mm) | Cooling rate (° C./s) | Cooling method | Water temperature (° C.) | Tempering temperature (° C.) |
|---|---|---|---|---|---|---|---|---|---|
| A1-1 | 1 | 1050 | 40 | 800 | 14 | 30 | Immerse into cooling tank | 90 | 470 |
| A1-2 | 1 | 950 | 40 | 800 | 14 | 30 | Immerse into cooling bath | 90 | 470 |
| A1-3 | 1 | 1150 | 40 | 800 | 14 | 30 | Immerse into cooling bath | 90 | 470 |
| A1-4 | 1 | 1050 | 30 | 800 | 14 | 30 | Immerse into cooling bath | 90 | 470 |
| A1-5 | 1 | 1050 | 60 | 800 | 14 | 30 | Immerse into cooling bath | 90 | 470 |
| A1-6 | 1 | 1050 | 40 | 750 | 14 | 30 | Immerse into cooling bath | 90 | 470 |
| A1-7 | 1 | 1050 | 40 | 850 | 14 | 30 | Immerse into cooling bath | 90 | 470 |
| A1-8 | 1 | 1050 | 40 | 800 | 14 | 5 | Air blast cooling | — | 470 |
| A1-9 | 1 | 1050 | 40 | 800 | 14 | 50 | Immerse into cooling bath | 40 | 470 |
| A2 | 2 | 1050 | 40 | 800 | 14 | 30 | Immerse into cooling bath | 90 | 500 |
| A3 | 3 | 1050 | 40 | 800 | 14 | 30 | Immerse into cooling bath | 90 | 460 |
| A4 | 4 | 1050 | 40 | 800 | 14 | 30 | Immerse into cooling bath | 90 | 520 |

TABLE 2-1-continued

| Manufac-turing No. | Steel No. | Rolling heating temperature (° C.) | Finish rolling reduction of area (%) | Rolling finish temperature (° C.) | Diameter of wire rod (mm) | Cooling rate (° C./s) | Cooling method | Water temperature (° C.) | Tempering temperature (° C.) |
|---|---|---|---|---|---|---|---|---|---|
| A5  | 5  | 1050 | 40 | 800 | 14 | 30 | Immerse into cooling bath | 90 | 430 |
| A6  | 6  | 1050 | 40 | 800 | 14 | 30 | Immerse into cooling bath | 90 | 520 |
| A7  | 7  | 1050 | 40 | 800 | 14 | 30 | Immerse into cooling bath | 90 | 450 |
| A8  | 8  | 1050 | 40 | 800 | 14 | 30 | Immerse into cooling bath | 90 | 470 |
| A9  | 9  | 1050 | 40 | 800 | 14 | 30 | Immerse into cooling bath | 90 | 460 |
| A10 | 10 | 1050 | 40 | 800 | 14 | 30 | Immerse into cooling bath | 90 | 470 |
| A11 | 11 | 1050 | 40 | 800 | 14 | 30 | Immerse into cooling bath | 90 | 500 |
| A12 | 12 | 1050 | 40 | 800 | 14 | 30 | Immerse into cooling bath | 90 | 490 |
| A13 | 13 | 1050 | 40 | 800 | 14 | 30 | Immerse into cooling bath | 90 | 480 |
| A14 | 14 | 1050 | 40 | 800 | 14 | 30 | Immerse into cooling bath | 90 | 470 |
| A15 | 15 | 1050 | 40 | 800 | 14 | 30 | Immerse into cooling bath | 90 | 490 |
| A16 | 16 | 1050 | 40 | 800 | 14 | 30 | Immerse into cooling bath | 90 | 490 |
| A17 | 17 | 1050 | 40 | 800 | 14 | 30 | Immerse into cooling bath | 90 | 480 |
| A18 | 18 | 1050 | 40 | 800 | 14 | 30 | Immerse into cooling bath | 90 | 480 |
| A19 | 19 | 1050 | 40 | 800 | 14 | 30 | Immerse into cooling bath | 90 | 480 |
| A20 | 20 | 1050 | 40 | 800 | 14 | 30 | Immerse into cooling bath | 90 | 470 |
| A21 | 21 | 1050 | 40 | 800 | 14 | 30 | Immerse into cooling bath | 90 | 460 |
| A22 | 22 | 1050 | 40 | 800 | 14 | 30 | Immerse into cooling bath | 90 | 480 |
| A23 | 23 | 1050 | 40 | 800 | 14 | 30 | Immerse into cooling bath | 90 | 470 |
| A24 | 24 | 1050 | 40 | 800 | 14 | 30 | Immerse into cooling bath | 90 | 460 |
| A25 | 1  | 1050 | 60 | 850 | 14 | 30 | Immerse into cooling bath | 90 | 470 |

TABLE 2-2

| Manufac-turing No. | Steel No. | Rolling heating temperature (° C.) | Finish rolling reduction of area (%) | Rolling finish temperature (° C.) | Diameter of wire rod (mm) | Cooling rate (° C./s) | Cooling method | Water temperature (° C.) | Tempering temperature (° C.) |
|---|---|---|---|---|---|---|---|---|---|
| B1-1  | 1  | <u>1200</u> | 40 | 800 | 14 | 30 | Immerse into cooling bath | 90 | 470 |
| B1-2  | 1  | 1050 | 40 | 800 | 10 | <u>90</u> | Immerse into cooling bath | 40 | 470 |
| B1-3  | 1  | 1050 | 40 | 800 | 14 | <u>2</u> | Air cooling | — | <u>400</u> |
| B1-4  | 1  | 1050 | 40 | <u>700</u> | 14 |  |  |  |  |
| B1-5  | 1  | 1050 | 40 | <u>950</u> | 14 | 30 | Immerse into cooling bath | 90 | 470 |
| B1-6  | 1  | 1050 | 40 | <u>900</u> | 14 | 30 | Immerse into cooling bath | 90 | 470 |
| B1-7  | 1  | 1050 | <u>20</u> | 800 | 14 | 30 | Immerse into cooling bath | 90 | 470 |
| B1-8  | 1  | 1050 | 40 | 800 | 14 | <u>100</u> | Immerse into cooling bath | Oil at 20° C. | 450 |
| B1-9  | 1  | 1050 | 40 | 800 | 14 | <u>120</u> | Immerse into cooling bath | 20 | 510 |
| B1-10 | 1  | 1050 | 40 | 800 | 14 | 30 | Immerse into cooling bath | 90 | <u>400</u> |
| B31 | <u>31</u> | 1050 | 40 | 800 | 14 | 30 | Immerse into cooling bath | 90 | 470 |
| B32 | <u>32</u> | 1050 | 40 | 800 | 14 | 30 | Immerse into cooling bath | 90 | <u>400</u> |
| B33 | <u>33</u> | 1050 | 40 | 800 | 14 | 30 | Immerse into cooling bath | 90 | <u>400</u> |
| B34 | <u>34</u> | 1050 | 40 | 800 | 14 | 30 | Immerse into cooling bath | 90 | <u>400</u> |
| B35 | <u>35</u> | 1050 | 40 | 800 | 14 | 30 | Immerse into cooling bath | 90 | <u>400</u> |
| B36 | <u>36</u> | 1050 | 40 | 800 | 14 | 30 | Immerse into cooling bath | 90 | 450 |
| B37 | <u>37</u> | 1050 | 40 | 800 | 14 | 30 | Immerse into cooling bath | 90 | 470 |
| B39 | <u>39</u> | 1050 | 40 | 800 | 14 | 30 | Immerse into cooling bath | 90 | 490 |
| B40 | <u>40</u> | 1050 | 40 | 800 | 14 | 30 | Immerse into cooling bath | 90 | 480 |
| B41 | <u>41</u> | 1050 | 40 | 800 | 14 | 30 | Immerse into cooling bath | 90 | 480 |

Underlines indicate that values fall outside the range of the present invention, or are below a target value.

TABLE 2-3

| Manufac-turing No. | Tempered martensite area ratio (%) | Prior γ grain average aspect ratio from surface layer to depth of 0.3 mm | Prior γ grain area ratio in which aspect ratio exceeds 3.0 in depth of 0.1 mm from surface layer (%) | Prior γ grain area ratio in which aspect ratio exceeds 3.0 in depth of 0.2 mm from surface layer (%) | Prior γ grain area ratio in which aspect ratio exceeds 3.0 in depth of 0.3 mm from surface layer (%) | Average value of prior γ grain area ratio in which aspect ratio exceeds 3.0 from surface layer to depth of 0.3 mm (%) | Prior γ grain area ratio in which aspect ratio exceeds 3.0 in depth of 0.5 mm from surface layer (%) |
|---|---|---|---|---|---|---|---|
| A1-1 | 100 | 3.82 | 87 | 84 | 87 | 86 | 85 |
| A1-2 | 97  | 3.82 | 87 | 86 | 85 | 86 | 85 |
| A1-3 | 98  | 3.82 | 86 | 85 | 87 | 86 | 85 |

TABLE 2-3-continued

| Manufacturing No. | Tempered martensite area ratio (%) | Prior γ grain average aspect ratio from surface layer to depth of 0.3 mm | Prior γ grain area ratio in which aspect ratio exceeds 3.0 in depth of 0.1 mm from surface layer (%) | Prior γ grain area ratio in which aspect ratio exceeds 3.0 in depth of 0.2 mm from surface layer (%) | Prior γ grain area ratio in which aspect ratio exceeds 3.0 in depth of 0.3 mm from surface layer (%) | Average value of prior γ grain area ratio in which aspect ratio exceeds 3.0 from surface layer to depth of 0.3 mm (%) | Prior γ grain area ratio in which aspect ratio exceeds 3.0 in depth of 0.5 mm from surface layer (%) |
|---|---|---|---|---|---|---|---|
| A1-4 | 98 | 3.82 | 86 | 86 | 86 | 86 | 85 |
| A1-5 | 96 | 3.82 | 87 | 86 | 85 | 86 | 85 |
| A1-6 | 92 | 4.52 | 86 | 86 | 86 | 86 | 84 |
| A1-7 | 100 | 3.12 | 88 | 85 | 85 | 86 | 86 |
| A1-8 | 90 | 3.82 | 85 | 87 | 83 | 85 | 84 |
| A1-9 | 100 | 3.82 | 85 | 87 | 86 | 86 | 85 |
| A2 | 100 | 4.06 | 87 | 86 | 88 | 87 | 86 |
| A3 | 93 | 4.47 | 88 | 85 | 85 | 86 | 85 |
| A4 | 92 | 5.18 | 90 | 87 | 87 | 88 | 87 |
| A5 | 94 | 5.71 | 91 | 97 | 90 | 93 | 92 |
| A6 | 100 | 3.89 | 88 | 89 | 87 | 88 | 87 |
| A7 | 97 | 5.25 | 90 | 88 | 88 | 89 | 88 |
| A8 | 100 | 3.72 | 87 | 82 | 80 | 83 | 82 |
| A9 | 100 | 6.48 | 100 | 99 | 97 | 99 | 98 |
| A10 | 100 | 5.44 | 90 | 90 | 91 | 90 | 89 |
| A11 | 96 | 9.78 | 100 | 100 | 100 | 100 | 99 |
| A12 | 95 | 5.00 | 86 | 84 | 89 | 86 | 86 |
| A13 | 98 | 3.14 | 87 | 86 | 82 | 85 | 84 |
| A14 | 100 | 4.91 | 91 | 88 | 88 | 89 | 88 |
| A15 | 100 | 6.26 | 97 | 96 | 98 | 97 | 96 |
| A16 | 100 | 4.70 | 88 | 84 | 89 | 87 | 86 |
| A17 | 98 | 5.05 | 88 | 87 | 86 | 87 | 86 |
| A18 | 97 | 5.43 | 93 | 90 | 88 | 90 | 89 |
| A19 | 94 | 3.92 | 90 | 84 | 90 | 88 | 87 |
| A20 | 99 | 4.99 | 88 | 87 | 84 | 86 | 85 |
| A21 | 92 | 4.48 | 93 | 72 | 79 | 81 | 80 |
| A22 | 100 | 3.28 | 84 | 83 | 85 | 84 | 83 |
| A23 | 97 | 5.53 | 92 | 91 | 91 | 91 | 90 |
| A24 | 100 | 4.18 | 85 | 85 | 85 | 85 | 84 |
| A25 | 98 | 3.20 | 90 | 80 | 70 | 80 | 80 |

TABLE 2-4

| Manufacturing No. | Tempered martensite area ratio (%) | Prior γ grain average aspect ratio from surface layer to depth of 0.3 mm | Prior γ grain area ratio in which aspect ratio exceeds 3.0 in depth of 0.1 mm from surface layer (%) | Prior γ grain area ratio in which aspect ratio exceeds 3.0 in depth of 0.2 mm from surface layer (%) | Prior γ grain area ratio in which aspect ratio exceeds 3.0 in depth of 0.3 mm from surface layer (%) | Average value of prior γ grain area ratio in which aspect ratio exceeds 3.0 from surface layer to depth of 0.3 mm (%) | Prior γ grain area ratio in which aspect ratio exceeds 3.0 in depth of 0.5 mm from surface layer (%) |
|---|---|---|---|---|---|---|---|
| B1-1 | 97 | 3.82 | 88 | 86 | 87 | 87 | 86 |
| B1-2 | 100 | 3.82 | 90 | 82 | 89 | 87 | 86 |
| B1-3 | <u>73</u> | | | | | | |
| B1-4 | | | | | | | |
| B1-5 | 99 | 1.22 | 20 | 16 | 24 | <u>20</u> | 22 |
| B1-6 | 99 | 2.12 | 46 | 40 | 52 | <u>46</u> | 47 |
| B1-7 | 96 | 1.57 | 34 | 31 | 31 | <u>32</u> | 31 |
| B1-8 | 100 | 3.14 | 90 | 81 | 90 | 86 | 86 |
| B1-9 | 100 | 3.75 | 90 | 80 | 88 | 88 | 86 |
| B1-10 | 100 | 3.81 | 86 | 84 | 86 | 86 | 85 |
| B31 | <u>74</u> | | | | | | |
| B32 | 90 | 4.37 | 90 | 90 | 90 | 90 | 89 |
| B33 | <u>77</u> | | | | | | |
| B34 | 94 | 5.22 | 99 | 99 | 90 | 96 | 95 |
| B35 | <u>70</u> | | | | | | |
| B36 | 94 | 4.63 | 87 | 86 | 85 | 86 | 85 |
| B37 | 100 | 5.16 | 97 | 94 | 94 | 95 | 94 |
| B39 | 91 | 2.43 | 68 | 66 | 25 | <u>53</u> | 15 |
| B40 | 92 | 2.28 | 50 | 46 | 53 | <u>50</u> | 49 |
| B41 | 100 | 2.78 | 58 | 58 | 61 | <u>59</u> | 58 |

Underlines indicate that values fall outside the range of the present invention, or are below a target value.

TABLE 2-5

| Manufacturing No. | Type of carbide | Tensile strength (MPa) | Critical diffusible hydrogen content (ppm) | Reference | Division |
|---|---|---|---|---|---|
| A1-1 | θ | 2026 | 0.54 | | Example of present invention |
| A1-2 | θ | 2124 | 0.49 | | Example of present invention |
| A1-3 | θ | 1912 | 0.50 | | Example of present invention |
| A1-4 | θ | 2142 | 0.48 | | Example of present invention |
| A1-5 | θ | 2082 | 0.51 | | Example of present invention |
| A1-6 | θ | 2120 | 0.48 | | Example of present invention |
| A1-7 | θ | 1975 | 0.50 | | Example of present invention |
| A1-8 | θ | 2063 | 0.52 | | Example of present invention |
| A1-9 | θ | 1912 | 0.50 | | Example of present invention |
| A2 | θ | 1906 | 0.63 | | Example of present invention |
| A3 | θ | 2091 | 0.57 | | Example of present invention |
| A4 | θ | 2100 | 0.54 | | Example of present invention |
| A5 | θ | 2076 | 0.62 | | Example of present invention |
| A6 | θ | 2061 | 0.53 | | Example of present invention |
| A7 | θ | 1952 | 0.73 | | Example of present invention |
| A8 | θ | 2107 | 0.48 | | Example of present invention |
| A9 | θ | 1997 | 0.85 | | Example of present invention |
| A10 | θ | 1964 | 0.74 | | Example of present invention |
| A11 | θ | 2137 | 1.01 | | Example of present invention |
| A12 | θ | 2013 | 0.67 | | Example of present invention |
| A13 | θ | 2078 | 0.55 | | Example of present invention |
| A14 | θ | 2046 | 0.61 | | Example of present invention |
| A15 | θ | 2052 | 0.69 | | Example of present invention |
| A16 | θ | 2138 | 0.62 | | Example of present invention |
| A17 | θ | 2050 | 0.65 | | Example of present invention |
| A18 | θ | 2063 | 0.59 | | Example of present invention |
| A19 | θ | 2098 | 0.52 | | Example of present invention |
| A20 | θ | 2007 | 0.65 | | Example of present invention |
| A21 | θ | 2043 | 0.49 | | Example of present invention |
| A22 | θ | 1950 | 0.52 | | Example of present invention |
| A23 | θ | 1982 | 0.74 | | Example of present invention |
| A24 | θ | 2026 | 0.58 | | Example of present invention |
| A25 | θ | 2005 | 0.51 | | Example of present invention |

TABLE 2-6

| Manufacturing No. | Type of carbide | Tensile strength (MPa) | Critical diffusible hydrogen content (ppm) | Reference | Division |
|---|---|---|---|---|---|
| B1-1 | θ | 2051 | | Generation of ferrite decarburization | Comparative example |
| B1-2 | θ | | | Generation of quenching cracks due to excessive freezing | Comparative example |
| B1-3 | ε | 1554 | | | Comparative example |
| B1-4 | | | | Generation of miss roll | Comparative example |
| B1-5 | θ | 2067 | 0.03 | | Comparative example |
| B1-6 | θ | 2092 | 0.16 | | Comparative example |
| B1-7 | θ | 2045 | 0.10 | | Comparative example |
| B1-8 | θ | | | Generation of quenching cracks due to excessive freezing | Comparative example |
| B1-9 | θ | | | Generation of quenching cracks due to excessive freezing | Comparative example |
| B1-10 | ε | 2038 | 0.36 | | Comparative example |
| B31 | θ | 1840 | | | Comparative example |
| B32 | ε | 1501 | | | Comparative example |
| B33 | ε | 1632 | | | Comparative example |
| B34 | ε | 1777 | | | Comparative example |
| B35 | ε | 1556 | | | Comparative example |
| B36 | θ | 2121 | 0.27 | | Comparative example |
| B37 | θ | 2000 | 0.31 | | Comparative example |
| B39 | θ | 1910 | 0.29 | | Comparative example |
| B40 | θ | 1939 | 0.26 | | Comparative example |
| B41 | θ | 1962 | 0.26 | | Comparative example |

Underlines indicate that values fall outside the range of the present invention, or are below a target value.

According to Tables 2-1 to 2-3, in any of the manufacturing No. A1-1 to A1-9 and A2 to A25 which are examples of the present invention, the area ratio of the tempered martensite was 90% or more, and the average value of the area ratios of the prior austenite grain in which the aspect ratio exceeds 3.0 was 80% or more from the surface layer to the depth of 0.3 mm. In addition, as a result, the tensile strength as the suspension spring was provided, the critical diffusible hydrogen content was 0.40 ppm or more, and the delayed fracture resistance properties were excellent.

Meanwhile, in B1-1 to B1-9, B31 to B37, and B39 to B41 which are comparative examples, any of the chemical components, the area ratio of the tempered martensite, and the average value of the area ratios of the prior γ grain in which the aspect ratio from the surface layer to the depth of 0.3 mm exceeds 3.0 was out of the range of the present invention. As a result, any of the tensile strength or the delayed fracture resistance properties deteriorated.

B1-1 is an example in which a ferrite decarburized layer was generated in a range from the surface to 30 μm or more in the wire for a spring since the heating temperature during the rolling was excessively high. B1-2, B1-8, and B1-9 are examples in which the quenching cracks were generated in the wire rod and the wire for a spring could not be manufactured since the cooling rate during the rapid cooling after the wire rod rolling was excessive high. B1-3 is an example in which sufficient tempered martensite fraction was not obtained and the tensile strength was low since the cooling rate during the rapid cooling after the wire rod rolling was excessively low. B1-4 is an example in which miss roll was generated and the wire for a spring could not be manufactured since the finish rolling temperature during wire rod rolling was extremely low. B1-5 and B1-6 are examples in which γ was recrystallized during the period from the winding to the quenching, and the area ratio of the prior γ grain in which the aspect ratio exceeds 3.0 from the surface layer to the depth of 0.3 mm become low since the finish rolling temperature was excessively high. B1-7 is an example in which the area ratio of the prior γ grain size in which the aspect ratio from the surface layer to the depth of 0.3 mm exceeds 3.0 become low since the reduction of area during the finish rolling was excessively small. In any of B1-5 to B1-7, the critical diffusible hydrogen content was low. In B1-10, the critical diffusible hydrogen content was low since the tempering temperature was low and E precipitated as the Fe-based carbide.

B31 is an example in which the retained γ amount in which the amount of C was excessively large increases, the tempered martensite fraction was not sufficiently obtained, and the tensile strength was low. B32 is an example in which a tensile strength was not sufficiently obtained as the wire for a spring since the amount of C was excessively small. B33 is an example in which the quenching was not sufficiently performed and the tensile strength was low since the composition had a small Kf. B34 is an example in which resistance to softening during the tempering was small and the tensile strength was low since the amount of Si was excessively small. B35 is an example in which the ferrite transformation was started during the period from the winding to the quenching, the tempered martensite fraction was not sufficiently obtained, and the tensile strength was low since the amount of Mn was excessively small. Each of B36 and B37 are examples in which the priory boundary was embrittled since the amounts of P and S was excessively large, and accordingly, are examples in which the critical diffusible hydrogen content was low. Each of B39, B40, and B41 are examples in which the effect of suppressing the recrystallization was not obtained since the amount of V was excessively small or V was not contained, and accordingly the critical diffusible hydrogen content was low.

INDUSTRIAL APPLICABILITY

According to the present invention, it is possible to provide steel for a suspension spring which has a high tensile strength that is 1900 MPa or more, and excellent hydrogen embrittlement resistance. By using the steel for a suspension spring, it is possible to increase the strength of a suspension spring, and thus, it is possible to contribute to reducing the weight of the suspension spring for a vehicle.

In addition, according to a method of manufacturing a steel for a suspension spring of the present invention, it is possible to manufacture the steel for a suspension spring having a high strength and excellent hydrogen embrittlement resistance by a general-purpose wire rod rolling line, and thus, it is possible to contribute to reduce the manufacturing costs.

Therefore, industrial contribution of the present invention is extremely large.

BRIEF DESCRIPTION OF THE REFERENCE SYMBOLS

1 STEEL FOR A SUSPENSION SPRING
11 POSITION FROM SURFACE TO DEPTH OF 0.1 mm
12 POSITION FROM SURFACE TO DEPTH OF 0.2 mm
13 POSITION FROM SURFACE TO DEPTH OF 0.3 mm

What is claim:

1. Steel for a suspension spring comprising, as a chemical composition, by % by mass:
   C: more than 0.40% and 0.65% or less;
   Si: 1.00% to 3.50%;
   Mn: 2.10% to 3.00%;
   Cr: 0.01% to 2.00%;
   V: 0.02% to 0.50%;
   Al: 0% to 0.060%;
   Mo: 0% or more and less than 0.50%;
   Cu: 0% to 1.00%;
   Ni: 0% to 1.50%;
   Nb: 0% to 0.015%;
   Ti: 0% to 0.200%;
   B: 0% to 0.0050%;
   P: limited to 0.020% or less;
   S: limited to 0.020% or less:
   N: limited to 0.0100% or less; and
   a remainder of Fe and impurities,
   wherein Kf defined by the following Equation (1) is 280 or more,
   wherein a structure contains a tempered martensite of which an area ratio is 90% or more,
   wherein a Fe-based carbide precipitated in the tempered martensite is a cementite,
   wherein an average of an area ratios of prior austenite grains which stretch in a longitudinal direction of the steel and of which an aspect ratio exceeds 3.0, is 80% or more in a case of depths of 0.1 mm, 0.2 mm, and 0.3 mm in a sheet thickness direction from a surface of the steel, and
   wherein a tensile strength is 1900 MPa or more, $$Kf = 10^{(3.288 \times C\,(\%) - 0.168 \times Si\,(\%) + 1.068 \times Mn\,(\%) + 0.3 \times Ni\,(\%) + 1.266 \times Cr\,(\%) + 0.626 \times Cu\,(\%) + 2.086 \times Mo\,(\%) - 1.931)} \quad (1)$$

here, C (%), Si (%), Mn (%), Ni (%), Cr (%), Cu (%), and Mo (%) in the equation (1) indicate the amounts of C, Si, Mn, Ni, Cr, Cu, and Mo by % by mass, and in a case where the elements are not contained, the value is 0.

2. The steel for a suspension spring according to claim 1, comprising, as a chemical composition, by % by mass:
   one of or two or more of Mo: 0.02% or more and less than 0.50%;
   Cu: 0.02% to 1.0%;
   Ni: 0.02% to 1.5%; and
   Nb: 0.002% to 0.015%.

3. The steel for a suspension spring according to claim 1 or 2, comprising, as a chemical composition, by % by mass:
   one of or both of Ti: 0.010% to 0.200%; and
   B: 0.0005% to 0.0050%,
   in case the steel comprises Ti and B, the amount of Ti and the amount of N satisfy Ti≥3.5×N.

4. A method of manufacturing the steel for a suspension spring according to claim 1, the method comprising:
- heating a steel piece containing the chemical composition within a temperature range of 950° C. or more and less than 1150° C.;
- a wire rod rolling including a finish rolling in which a reduction of an area is 30% or more and a finish rolling temperature is 750° C. to 850° C., with respect to the heated steel piece to obtain a wire rod;
- winding with respect to the wire rod to make the wire rod into a coil;
- cooling the coil so as to start cooling in 5 to 30 seconds after the performing of the winding and to set an average cooling rate when the temperature is 800 to 300° C. to be 5 to 50° C./s to cool the coil until reaching 300° C. or less; and
- tempering of retention for 10 to 1800 seconds at 410° C. to 550° C. after the cooling.

5. A method of manufacturing the steel for a suspension spring according to claim 2, the method comprising:
- heating a steel piece containing the chemical composition within a temperature range of 950° C. or more and less than 1150° C.;
- a wire rod rolling including a finish rolling in which a reduction of an area is 30% or more and a finish rolling temperature is 750° C. to 850° C., with respect to the heated steel piece to obtain a wire rod;
- winding with respect to the wire rod to make the wire rod into a coil;
- cooling the coil so as to start cooling in 5 to 30 seconds after the performing of the winding and to set an average cooling rate when the temperature is 800 to 300° C. to be 5 to 50° C./s to cool the coil until reaching 300° C. or less; and
- tempering of retention for 10 to 1800 seconds at 410° C. to 550° C. after the cooling.

6. A method of manufacturing the steel for a suspension spring according to claim 3, the method comprising:
- heating a steel piece containing the chemical composition within a temperature range of 950° C. or more and less than 1150° C.;
- a wire rod rolling including a finish rolling in which a reduction of an area is 30% or more and a finish rolling temperature is 750° C. to 850° C., with respect to the heated steel piece to obtain a wire rod;
- winding with respect to the wire rod to make the wire rod into a coil;
- cooling the coil so as to start cooling in 5 to 30 seconds after the performing of the winding and to set an average cooling rate when the temperature is 800 to 300° C. to be 5 to 50° C./s to cool the coil until reaching 300° C. or less; and
- tempering of retention for 10 to 1800 seconds at 410° C. to 550° C. after the cooling.

* * * * *